April 21, 1925.

D. M. GRAHAM

1,534,112

APPARATUS FOR CUTTING AND STACKING GRAIN

Filed April 6, 1918 7 Sheets-Sheet 1

April 21, 1925.

D. M. GRAHAM 1,534,112

APPARATUS FOR CUTTING AND STACKING GRAIN

Filed April 6, 1918    7 Sheets-Sheet 6

April 21, 1925.  1,534,112

D. M. GRAHAM

APPARATUS FOR CUTTING AND STACKING GRAIN

Filed April 6, 1918   7 Sheets-Sheet 7

Patented Apr. 21, 1925.

1,534,112

UNITED STATES PATENT OFFICE.

DAVID M. GRAHAM, OF BORDULAC, NORTH DAKOTA, ASSIGNOR TO GRAHAM-ROACH HARVESTER AND STACKER COMPANY OF NORTH DAKOTA.

APPARATUS FOR CUTTING AND STACKING GRAIN.

Application filed April 6, 1918. Serial No. 227,072.

*To all whom it may concern:*

Be it known that I, DAVID M. GRAHAM, a citizen of the United States, residing at Bordulac, in the county of Foster and State of North Dakota, have invented certain new and useful Improvements in Apparatus for Cutting and Stacking Grain, of which the following is a specification, reference being had therein to the accompanying drawing.

The invention relates to improved stack forming mechanism; and also to the combination therewith of grain cutting and transporting or elevating mechanism and an actuating ground wheel therefor by means of which, and a suitable frame, the stack former counterbalances the cutting apparatus, including the grain platform, and holds the same above the ground without the aid of a grain wheel.

The stack former, irrespective of the cutting apparatus, is constructed to form a stack having its greatest dimension or length parallel with the sickle and crosswise of the line of draft, so that in depositing the stack in a rearward direction it is delivered sidewise of the stack and in the direction of the short or narrow dimension of the stack. The space forming devices, whereby air spaces are formed in the stack for the curing of grain in the field, as set forth in my Patent No. 1,332,495, granted March 2, 1920, must, or preferably do, extend parallel with the direction of the delivery of the formed stack, and by forming the stack with its dimensions arranged as above stated I am enabled to increase the capacity of the stack and of the machine and at the same time produce air spaces which are sufficiently short (from front to rear of the stack) to allow the air circulation, out from and into the stack, desired for the proper curing of the grain.

The machine also embodies other improvements designed to make it more convenient and efficient in operation.

With such objects in view, as well as other advantages which may be incident to the use of the improvements the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Referring to the drawings, the main elements of the machine consist of a grain cutting means A comprising a sickle 1, an actuating pitman 2 which is driven from the bull wheel 3 by suitable mechanism, and a movable belt platform 4 which receives the cut grain from the sickle; a grain elevating means B comprising a pair of belts 5 and 6 arranged in a casing 7 to receive cut grain from the platform 4, and passing over rollers 8, 9, 10 and 11, certain of which rollers are driven by mechanism connecting them with the bull wheel 3; a stack former C arranged to receive the cut grain as it is elevated; a main frame D for the grain cutting and elevating means and supported by the bull wheel, said frame being regulated by the counterbalancing effect of the stack former and its frame; a stack former supporting frame E which is connected with the frame D and is supported by the said bull wheel and by a ground wheel 13 at the stubble end of the machine; and a draft device F which does or may comprise a tongue 13′ connected with the frames D and E and a tongue 14 connected with the stack former frame E. In the present illustration of the invention these tongues as shown are adapted to be drawn by teams of horses, but any suitable tractor means may be employed.

Figures 9, 10, 13, 14:
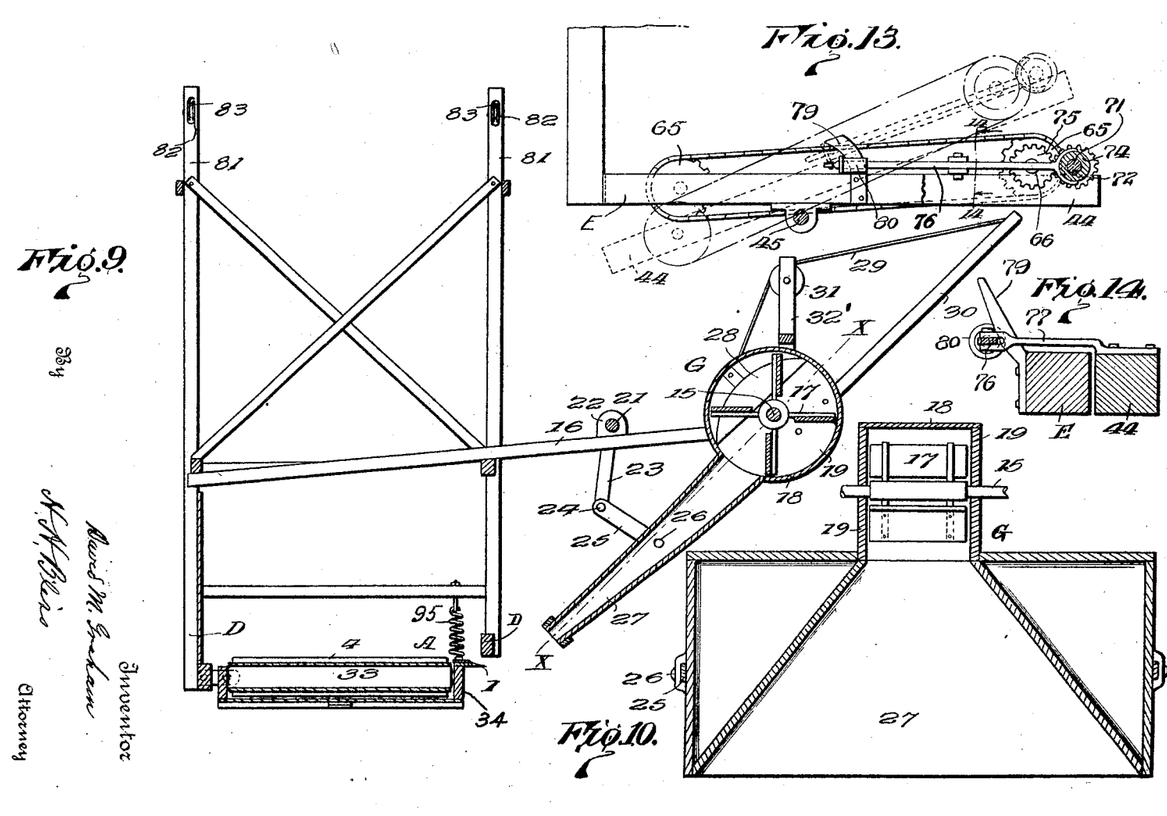
Fig. 9 is a vertical section substantially on line IX—IX of Fig. 1.
Fig. 10 is a section on line X—X of Fig. 9.
Fig. 13 is a detail elevation of parts of the stack delivering devices, showing the same in normal position in full lines and in tilted position in dotted lines.
Fig. 14 is a section on the line 14—14 of Fig. 13.

G is a pneumatic device (Figs. 9 and 10) adapted to force the standing grain against the sickle, taking the place of a reel, with material advantages thereover, in compelling the stalks, especially of short grain, to be severed by the sickle and not merely bent down forwardly. This pneumatic device comprises a rotary fan shaft 15 carried in suitable bearings on frame members 16 of the frame D. Fixed on said shaft is a fan 17 enclosed in a fan casing 18. The heads 19 of the casing are loosely mounted on the shaft so as to have a rotary bearing thereon for the adjustment of the casing through a limited angle. Such adjustment is effected by a hand lever 20 arranged near the driver's seat and attached to an adjusting shaft 21, the latter being mounted in bearings 22 on the frame members 16. Fixed on the shaft 21 is an arm 23 which is pivoted at 24 to a link 25, the latter being pivotally connected at 26 with the fan delivery spout 27. The latter is fixed on the casing 18 and preferably has a widely-flaring mouth (as seen in Fig. 10) by which an air blast may be applied to the grain for substantially the length of the sickle. The operation of the hand lever 20 will turn the shaft 21 and adjust the spout 27 to a relatively low point adapted to force short grain towards the sickle (as shown in Fig. 9), or to a higher point adapted for action on tall grain. Whereas the action of a reel on the grain is intermittent, and when adjusted to strike very short grain is likely to be jolted so as to encounter the cutting apparatus and be damaged, the action of the air from the spout 27 is constant and can be readily applied to the shortest grain, and has the further advantage that it can keep the sickle entirely clean and blow short cut-off heads back from the sickle on to the platform and prevent such heads from falling on the ground. The air current may thus operate upon grain heads which a reel could not safely be adjusted to strike, and would in many cases leave such heads uncut and standing, or would allow of their being lost upon the ground. It is preferable to have a stronger air current for the short grain than for the tall grain, and I provide automatic means whereby the adjustment of the spout upwards will reduce the amount of air passing through the fan and its adjustment downward will increase the air supply, such means consisting of one or more air valves 28 hinged on the end of the casing head 19 and connected by a cord 29 with an arm 30, said arm being fixedly attached to the casing head. The cord 29 passes around a pulley 31 mounted on a standard 32′ attached to a part of the frame 16, the operation of these parts being to slacken the cord 29 when the spout is adjusted downward and the arm 30 approaches the pulley 31, so that the valve 28 is allowed by gravity or otherwise to open or become more open (Fig. 9); and when the spout 27 is adjusted upward the arm 30 will draw on the cord 29 and close or partly close the said valve 28. This valve arrangement is or may be applied to both heads of the fan.

The rollers 32, 33 of the platform apron 4 are mounted in a frame 34 (Fig. 7) which is tiltable up and down on a rear pivot 35. The frame 34 carries the sickle at its front side and is tiltable at will by a hand lever 36 to cause the grain stalks to be cut off at the desired distance above the ground. Such distance will depend upon the shortness of the standing grain, and also upon its dry or green condition. If the stalks are green enough to contain excess of moisture above the average they should ordinarily be cut higher so as not to include too much moisture with the berries in the stalk. A certain amount of moisture is an aid to maturing, improving and curing the grain berries in the stack, but an excess of moisture (or sap in the stalks) is a detriment. The amount of stalk and sap which may be profitably included in the stack will ordinarily depend upon the maturity of the grain at the time of cutting and the dryness or dampness of the weather and air. The adjustments of the sickle and grain platform by tilting and of the fan spout 27 by a corresponding movement are to be conformed with each other for the desired results of harvesting all of the heads of the grain and so much of the stalks as will promote the process of curing the grain berries in the stack.

Figure 2:
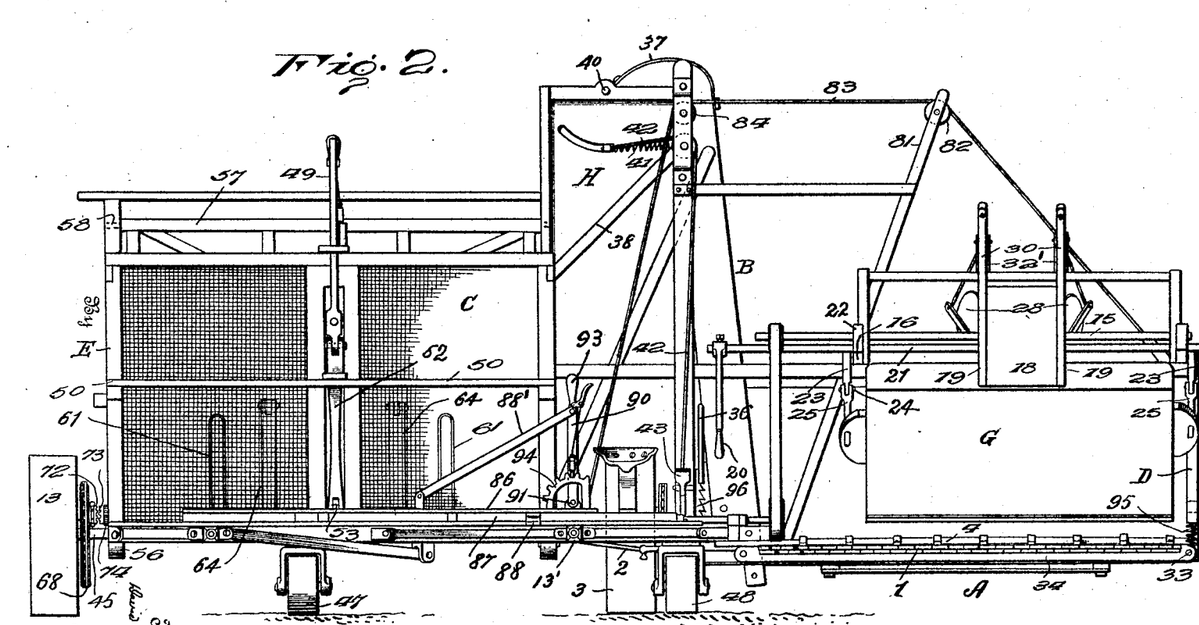
Fig. 2 is a front elevation of the same.
Figure 3:
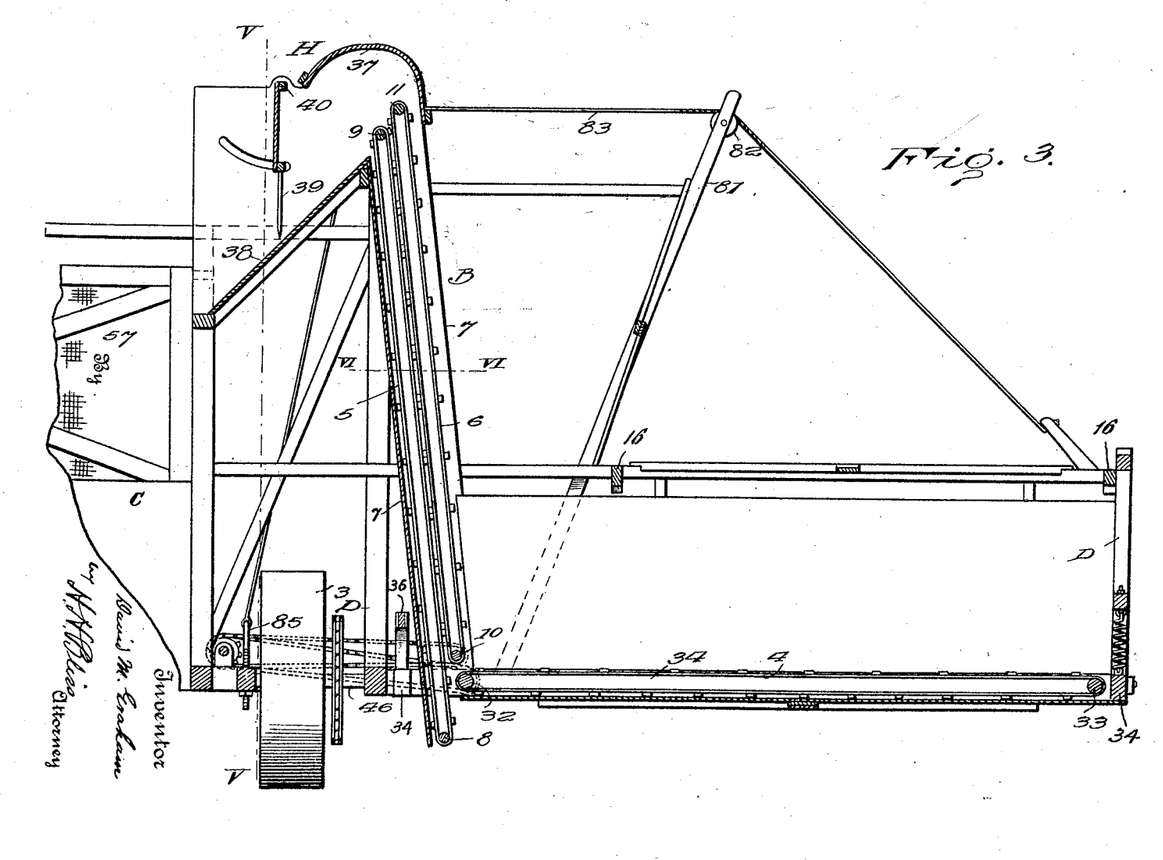
Fig. 3 is a vertical section on line III—III of Fig. 1.
Figure 4:
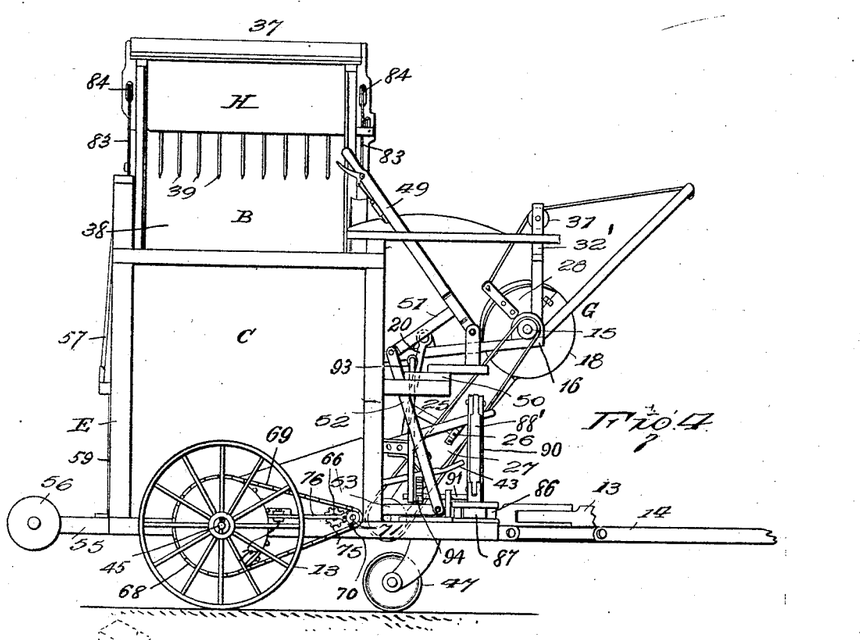
Fig. 4 is an end elevation of the stubble or offend of the machine.
Figures 5, 6:
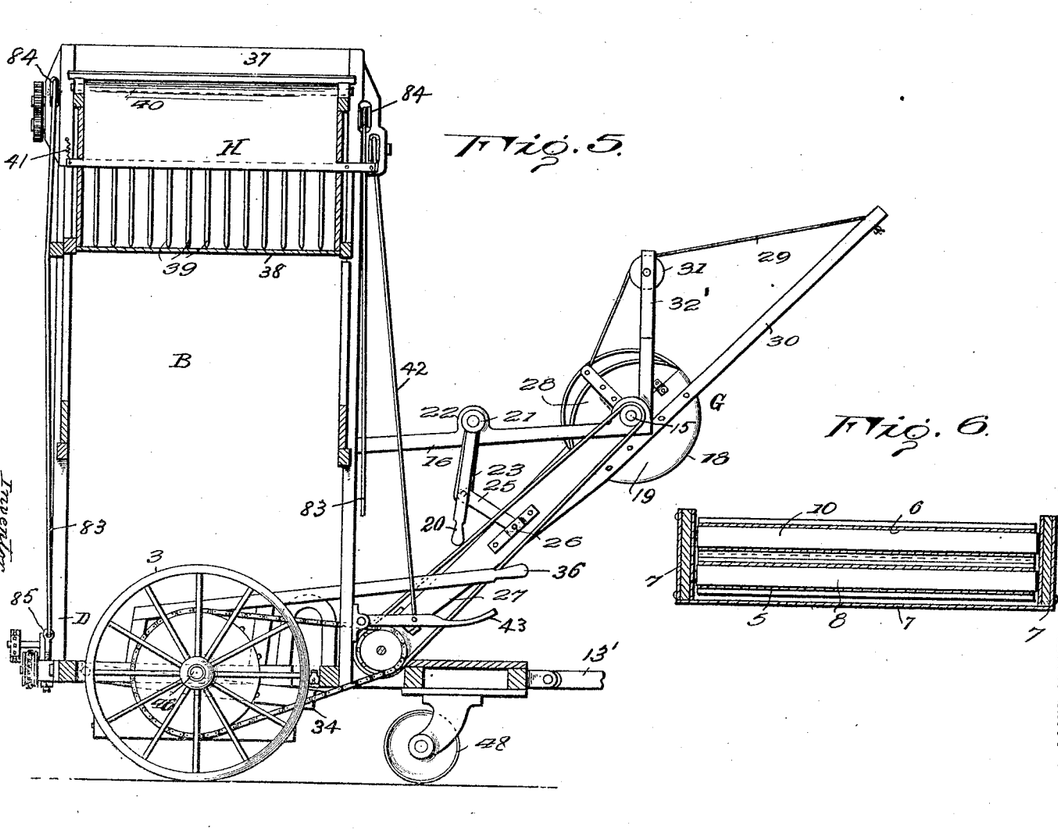
Fig. 5 is a vertical section on line V—V of Fig. 3.
Fig. 6 is a substantially horizontal section on line VI—VI of Fig. 3.
Figure 8:
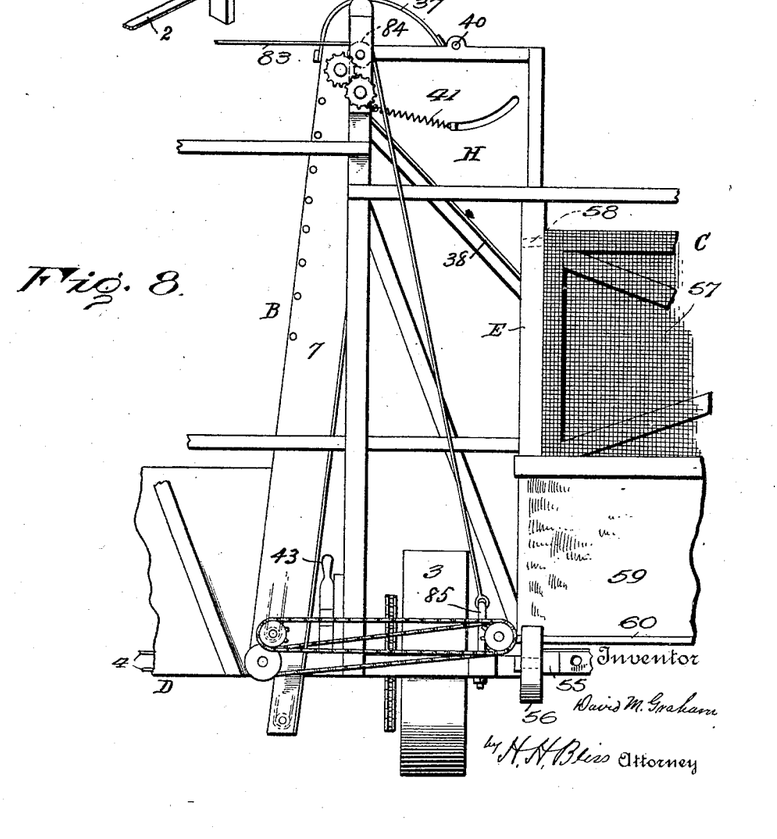
Fig. 8 is a rear view of the central and grain elevating part of the machine.

H is a bunching device which operates automatically to drop the grain, transported by the platform apron 4 and elevator belts 5 and 6, intermittently in bunches or fork-fulls into the stack former C. It comprises a hood 37 forming a chamber at the upper end of the elevating means B, which chamber has a bottom 38 inclining rather steeply to the upper part of the stack former (Fig. 3). As the elevated grain slides down said bottom from the elevator it is temporarily arrested by a yieldable gatherer 39 mounted on a longitudinal pivot bar 40 and swingable towards and from the bottom 38. When a bunch of grain has accumulated to predetermined weight against the gatherer the latter swings away from the bottom 38 and the bunch drops into the stack former and the gathering of another bunch begins. This prevents the grain from dropping in scattered stalks variously arranged and keeps it in small masses with the heads of the stalks all together, which masses may be handled as fork-fulls by an operative in the stack former and placed as may be required in building up the stack. It also enables the operative with a fork to readily arrange the grain with its heads towards the middle of the stack for the better curing of the berries. The gatherer is or may be held against the bunching grain by one or more springs 41 attached to the end or ends of the gatherer (Figs. 2 and 8) and to the elevator frame, which springs will be caused to give resistance necessary to accumulate a bunch of the desired weight or size. Also the gatherer may be returned, or held against the grain, by a cord 42 operated by a foot lever 43. The bottom 44 of the stack former is tiltable on a transverse axis parallel with the long dimension of the stack, being mounted on a shaft 45 which is supported in suitable bearings on the under side of the frame E and carries the ground wheel 13. The shaft 45 is preferably arranged in line with the axle 46 of the bull wheel 3. The frame E is further supported at its front by a caster or other ground wheel 47, and the frame D is similarly supported by a wheel 48. The bottom 44 of the stack former is tilted rearwardly for the deposit of the stack by a hand lever 49 operable by a man on the platform 50, said lever acting by an arm 51, link 52, and arm 53 (Fig. 4) attached to the bottom 44, to pull the front side of said bottom upward at will when it is desired to deposit the formed stack. Attached to and extending rearwardly from the bottom 44 are rods 54 on which the stack may slide to the ground, and arms 55 carrying wheels 56 which may trail on the ground as the stack slides out of the former. The rear wall 57 of the former is a gate swingable rearwardly, as the stack is deposited, on pivots 58 arranged near the top of such gate and mounted in the frame E (Figs. 2 and 8). The lower part of the gate 57 preferably consists of a flexible curtain 59 attached at its upper edge to the gate frame, depending to near the bottom 44 and held down yieldably by the weight of a transverse rod 60 attached to the lower edge of the curtain. This gate is opened by the stack and returns by gravity, and its light construction and the flexibility of its lower part 59 enables the stack to open and slide under the gate without being deformed.

Figure 1:
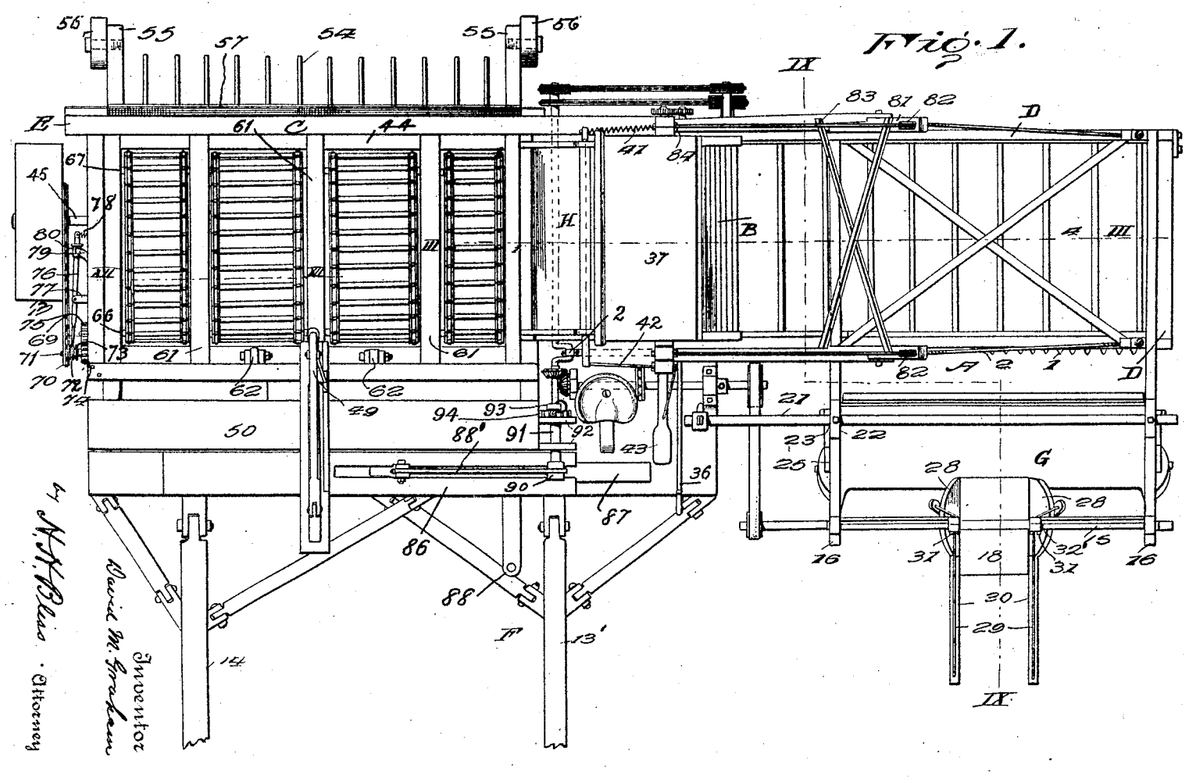
Fig. 1 is a plan view of a grain cutting and stack forming machine embodying the invention.
Figures 11, 12:
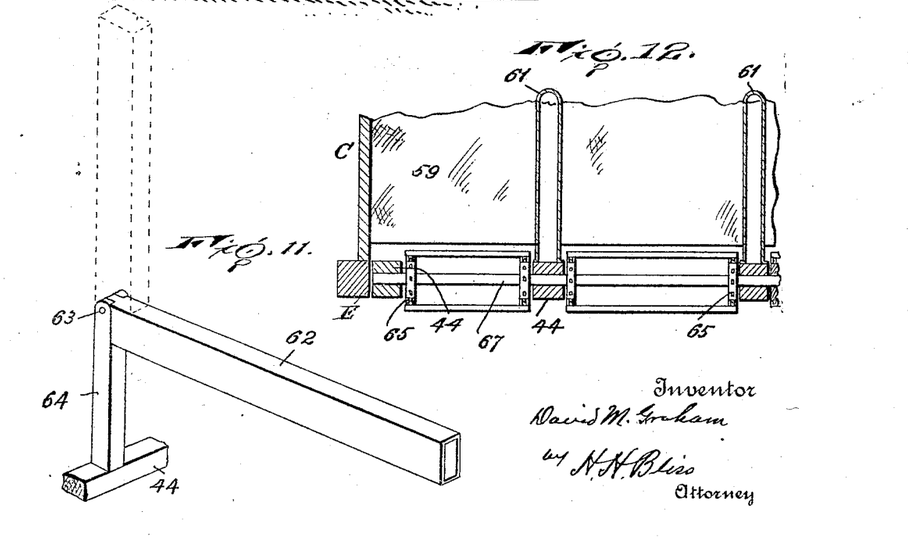
Fig. 11 is a perspective view of one of the adjustable ventilating air space formers, showing in dotted lines the inactive position of the same.
Fig. 12 is a vertical section of a portion of the stack former on line XII—XII of Fig. 1.

On the bottom 44 are fixed air space formers 61, preferably hollow bodies of sheet metal, which extend from front to rear of the bottom and around which the base of the stack is packed and formed, so that when it has been deposited on the ground the stack will have ventilating and grain curing openings through it corresponding with said formers 61. The latter may be of suitable size and number, three being indicated in the structure illustrated (Figs. 1 and 2). At 62 are shown supplemental and adjustable air space formers arranged at a higher level than the formers 61 and adapted, when used, to produce air spaces in the stack at points above the ground. The formers 62 are hollow pipe-like bodies and may be formed of sheet metal. They are arranged to alternate with the formers 61 and are pivotally mounted at 63 on supports 64 fixed on the bottom 44 at its front edge. When not in use the formers 62 are turned up on the pivots 63 so as to extend vertically along the inner face of the front wall of the stack former (Fig. 1); or if the grain which is being cut is excessively moist the formers 62 are turned down into horizontal position (Figs. 2 and 11) so as to extend from front to rear of the stack former, the grain is packed under and around them as the stack is built up, and when the stack is deposited the formers 62 (as well as the formers 61) will be drawn out of the stack leaving additional ventilating air spaces alternating with and above the air spaces produced by the formers 61. Such additional air spaces will be a material aid in causing dry air to work into the stack and throughout the interstices thereof, and moisture laden air to work out, and the formation of the stack is thereby adapted for the curing of grain containing sap and moisture in excess of the average amount. The formers 62 remain in either of said positions by reason of the frictional tightness of their pivots 63, or by any suitable holding means.

The bottom 44 is provided with propelling means on which the stack rests, in the spaces between the air space formers 61, and by which the stack is bodily carried rearward for deposit when the bottom 44 is tilted rearwardly as above described. Said propelling means consists of an endless belt carrier or carriers the chains or equivalent connecting means of which are mounted on sprocket wheels 65 and said sprockets are mounted on front and rear rotary shafts 66, 67, said shafts having suitable bearings in the end bars of the bottom 44. In the construction illustrated four separate carriers are illustrated arranged to be operated together as one carrier. This operation is effected by a chain wheel 68 fixed on the ground wheel 13 or the shaft thereof, a chain 69, and a sprocket wheel 70 mounted loosely on the idler or pivot shaft 71 (Figs. 1, 2 and 4) which is mounted on the frame of the bottom 44 in front of the shaft 66. The sprocket 70 is provided on its inner face with a clutch member 72 adapted to interclutch with a corresponding clutch member 73 which is fixed to a pinion 74 on said shaft 71. The pinion 74 meshes with a corresponding pinion 75 fixed on the carrier shaft 66. The sprocket wheel 70 with its clutch member is shiftable towards and from the inner clutch member 73 by a horizontal fork lever 76 pivotally mounted by a bracket 77 on the frame of the bottom 44. The parts are normally held out of clutch by a spring 78 applied to the rear end of the lever 76. 79 is a cam fixed on the frame E, and this cam is engaged by a roller 80 mounted on the lever 76. The construction is such that when the bottom begins to tilt rearwardly the cam 79 will throw the lever 76 to cause the clutch member 72 to engage with the clutch member 73, whereupon the carriers will move backwardly and convey the formed stack positively out of the stack former for deposit on the ground.

81 is a strut frame forming a part of the main frame D, said strut having mounted in the upper part thereof rollers 82 (Fig. 2). 83 indicates flexible tension devices, such as wire ropes which are attached to the grain end of the frame D, pass over the rollers 82, and over rollers 84 mounted near the upper end of the elevator-supporting part of the frame D, and extend thence down to eye-bolts 85 (Fig. 3), which are adjustably mounted in the bottom part of the frame D, at the stubble side of the bull wheel. By these means strong tension may be applied above and across the bull wheel to hold up the grain end of the frame D without the use of any grain wheel.

In connection with the above described machine, and mounted on a forward part of the base frame thereof I have shown a draft adjusting means for carrying an evener, to which in turn the whiffletrees would be attached, for the purpose of applying the draft centrally to the machine as a whole. This adjusting means comprises a guide 86 fixed to the main frame in which is adapted to slide a transverse bar 87, this bar having a forward clevis 88 to which the evener is to be pivoted. The slide 87 carrying the evener with it is adjusted laterally in its guide by means of a link 88', and an arm 90, the latter being fixed on a short longitudinal shaft 91. This shaft is mounted near the driver's seat in bearings 92 and has fixed thereon a hand lever 93 which is held in adjusted position by a bolt and rack device 94 of known construction.

The stack when delivered to and in proper condition on the ground similar to those produced by machines that I have heretofore made such as shown in my Patent No. 1,104,885, has, broadly, the advantages incident to forming such a mass without bundle-binding and having the straws in compact but unbound condition. When the stacks are formed with an extended length dimension, as shown, they can at the time of depositing on the ground be shaped in a superior way for permitting the access of air. As illustrated in the drawings from four to seven transverse air passages can be formed, all of them of short dimension, and these may be varied in number as desired by constructing the stack former with the desired number of forming elements, according to the length of the stack.

Relative to the cross area of a ventilating opening each unit of air which passes said area is required to properly supply a less area of the stack and of the straw within the same than if said opening were longer. A shorter air passage increases the desired beneficial and curing action of the air during a unit of time; also the space forming elements may be withdrawn from the stack with less resistance and impairment of the shape of the stack.

Figure 7:
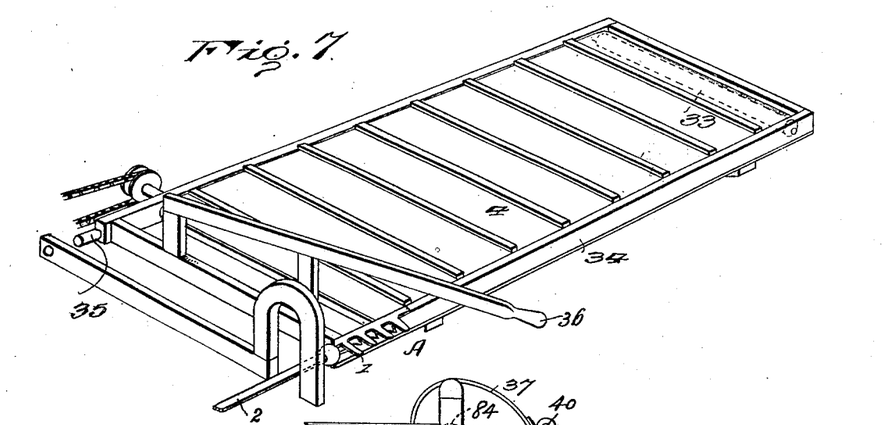
Fig. 7 is a perspective view of the grain platform of the cutting apparatus.

95 is a spring whereby the front side of the platform 4 is suspended (Fig. 9), the latter being pivoted at its rear side on its transverse axis at 35 (Fig. 7). The platform is adjustably depressed as may be required by the condition of the grain by said lever 36, (Fig. 7) and this lever is held in its depressed position by a rack 96 (Fig. 2) against the stress of the spring 95.

In forming a stack the base of the same may be laid between and on the space formers 61 until they are covered, the adjustable formers 62 in the meantime being in vertical position, and then said adjustable space formers may be turned down into horizontal position and the upper parts of the stack completed between and on them.

What I claim is:

1. A stack former having an elongated body for the formation of a stack of grain which is elongated in one horizontal direction and relatively narrow in the other horizontal direction, combined with means for forming ventilating air space openings through the stack in the direction of its narrower dimension.

2. In a transportable stack former, the combination of end stack-forming walls, a front side stack-forming wall, an opposite rear side stack-forming outwardly movable wall, a wheeled support, and a bottom for dumping the stack, said bottom being movable relative to said stack forming walls and inclinable towards said outwardly movable side wall to deposit the stack at the rear of the course of the machine, the narrower dimension of said stack former extending along said end walls parallel with the line of draft.

3. In a transportable stack forming machine, the combination of means for supplying grain to be stacked, a stack former adapted to receive the grain and elongated in a direction transverse to the direction in which the stack is deposited and having its other horizontal dimension relatively narrower, air space forming means in said stack former, and means for depositing said stack in a direction parallel with its narrower dimension, whereby the air spaces are made shorter relative to the capacity of the stack.

4. In a stack forming machine, the combination of means for supplying grain to be stacked, a stack former adapted to receive said grain, air space forming and defining means in the bottom of said stack former, supplemental air space formers arranged in the stack former at a distance above the bottom, and means for depositing said stack.

5. In a grain cutting and stack forming machine, the combination of grain cutting and elevating means, a stack former adapted to receive the elevated grain and elongated in a direction parallel with the line of cutting, and having its other horizontal dimension relatively narrower, air space forming means in the bottom of said stack former, supplemental air space formers arranged in the stack former at a distance above the bottom, and means for depositing said stack in a direction parallel with its narrower dimension.

6. The combination of a stack former, grain cutting mechanism, grain elevating means adapted to deliver cut grain above said stack former, and adjustable space forming means in said stack former adapted to be adjusted into operative position across said stack former and also into inoperative position.

7. The combination of a stack former, grain cutting mechanism, grain elevating means adapted to deliver cut grain above said stack former, and adjustable space forming means in said stack former pivotally mounted at one end near a wall of the stack former adapted to be adjusted into operative position across said stack former and also into inoperative position.

8. The combination of a stack former having means for depositing a formed stack therefrom, a cutting apparatus, means for transporting the cut grain to said stack former, and an automatically acting buncher arranged to intercept said grain and collect bunches of the same which are intermittently delivered to said stack former.

9. The combination of a stack former having means for depositing a formed stack therefrom, a cutting apparatus, means for transporting the cut grain to said stack former, an automatically acting buncher arranged to intercept said grain and collect bunches of the same which are intermittently delivered to said stack former, and means for controlling said buncher at will to prevent its operation during the deposit of a formed stack.

10. The combination of a stack former having means for depositing a formed stack therefrom, a cutting apparatus, means for transporting the cut grain to said stack former, an automatically acting buncher arranged to intercept said grain and collect bunches of the same which are intermittently delivered to said stack former, and springs for controlling said buncher.

11. The combination of a stack former having means for depositing a formed stack therefrom, ventilating air space forming means in said stack former, a cutting apparatus, means for transporting the cut grain to said stack former, and an automatically acting buncher arranged to intercept said grain and collect bunches of the same which are intermittently delivered to said stack former, springs for controlling said buncher, and means for controlling said buncher at will to prevent its operation during the deposit of a formed stack.

12. In the art of curing grain and the like, the method of forming the stack, which consists in building up and forming an elongated stack, and producing therein and extending across the narrower dimension of the stack a series of ventilating air spaces.

13. In the art of curing grain and the like, the method of forming and depositing a stack of the same for maturing and curing the grain berries without overheating, which consists in building up and forming a stack exteriorly, forming the stack interiorly with a series of ventilating air spaces extending across the narrower dimension of the stack, and depositing the stack in the direction of such narrower dimension.

14. In an apparatus for stacking grain unbound and in the mass for curing, the combination of a grain platform, a cutter carried thereby, means for transporting the cut grain, a stack former to which the grain is delivered by said transporting means, a supporting ground wheel substantially between the stack former and the grain cutting and transporting devices, and a truss frame comprising tension elements extending over said ground wheel and connected with said stack former, said tension elements at the grain side being connected with said platform of the cutting apparatus and supporting the same independently of any grain wheel.

15. A stack former having front, rear and side walls, the latter being of greater length than the front and rear walls, means for forming air spaces in a stack extending parallel with the side walls, and means for depositing a stack from the former in a direction parallel with the side walls thereof.

16. A stack former adapted to receive cut grain to be stacked, air space forming means in the bottom of said stack former, supplemental air space formers arranged in the stack former at a distance above the bottom, and means for depositing said stack.

17. A transportable stack former having front, rear and side walls, and adapted to receive grain to be stacked, said former being elongated in a direction parallel with the side walls thereof and having its front and rear walls relatively shorter than the side walls, air space forming means in the bottom of said stack former, supplemental air space formers arranged in the stack former at a distance above the bottom, and means for depositing a stack from said former in a direction parallel with the side walls thereof.

18. The combination of a stack former, and adjustable space forming means in said stack former adapted to be adjusted into operative position across said stack former and also into inoperative position.

19. The combination of a stack former, and adjustable space forming means pivotally mounted within the stack former and adapted to be adjusted into operative position across said former or into inoperative position.

20. The method of curing grain and the like by producing a stack, the base of which is horizontally elongated in one direction and relatively narrow in the transverse direction and forming ventilating air spaces at different heights in said stack and extending parallel with the narrower dimension of the stack, for the purpose described.

In testimony whereof, I affix my signature.

DAVID M. GRAHAM.